Figure 1:
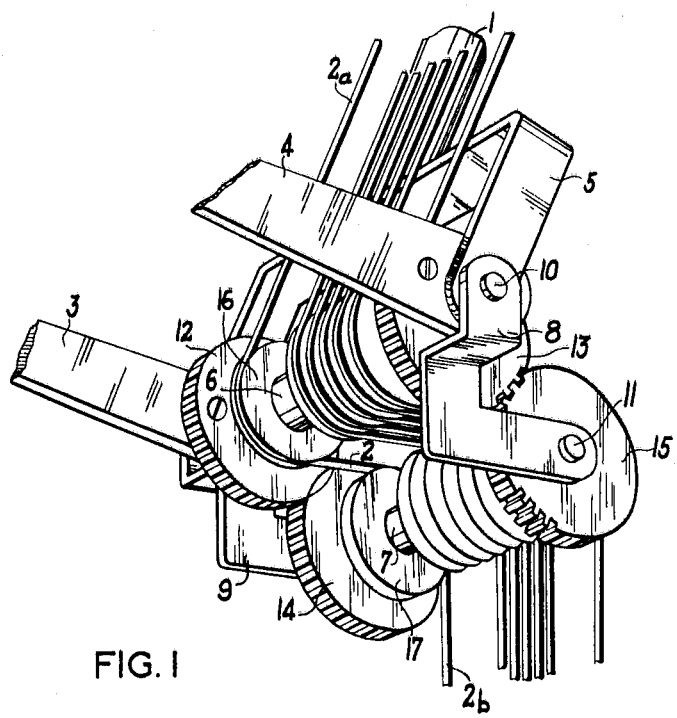

July 19, 1966 J. VERTUT 3,261,223
ARTICULATION DEVICES WITH TRANSMISSION OF MOVEMENTS
Filed Nov. 1, 1963 2 Sheets-Sheet 1

INVENTOR
JEAN VERTUT
BY Bacon & Thomas
ATTORNEYS

July 19, 1966      J. VERTUT      3,261,223

ARTICULATION DEVICES WITH TRANSMISSION OF MOVEMENTS

Filed Nov. 1, 1963      2 Sheets-Sheet 2

INVENTOR
JEAN VERTUT
BY
*Bacon & Thomas*
ATTORNEYS

United States Patent Office 3,261,223
Patented July 19, 1966

3,261,223
ARTICULATION DEVICES WITH TRANSMISSION OF MOVEMENTS
Jean Vertut, Paris, France, assignor to Commissariat à l'Energie Atomique, Paris, France
Filed Nov. 1, 1963, Ser. No. 320,637
Claims priority, application France, Nov. 2, 1962, 914,276
6 Claims. (Cl. 74—380)

The present invention relates to articulation devices which provide for the transmission of movements by means of cables, belts, chains and/or gears.

Numerous examples of such devices exist in which it proves a matter of difficulty to design supports for such cables, belts or chains in such manner as to ensure that the length of these latter is maintained constant while the angular movement of an articulated coupling takes place or, in the case of gears, to design kinematic chains in such manner that the angular displacement of an articulated coupling does not produce any reaction on said kinematic chain.

This problem has hitherto been solved at least partially by associating the movements of two articulated couplings in such a manner that, as the angular displacements of these latter take place, any variations in length of cables, belts or chains and/or any reactions on the kinematic chains are reciprocally compensated.

The object of the invention is to design the above-mentioned devices in such a manner that these latter conform to the various requirements met with in practice in a more effective manner than has hitherto been achieved, especially insofar as said devices offer a precise solution to the problem noted above by providing an articulated coupling between two members without thereby permitting the angular displacement of said articulated coupling to produce any variation in the length of the transmission or to result in the movement of a kinematic chain.

The invention mainly consists in that each of the two members to be pivotally coupled is provided with at least one toothed sector which is made integral with said member and the shaft of which carries the system of transmission of movement by cables, belts, chains and/or gears and in that each of the two toothed sectors thus provided is caused to mesh with the other while maintaining constant by any suitable means the distance between the two shafts of said sectors.

Apart from this main arrangement, the invention additionally consists in certain other arrangements which are preferably employed at the same time and which are to be considered either separately or in combination, namely:

The distance between said two shafts is maintained constant by means of at least one connecting-arm which is independent of the members to be pivotally coupled.

The transmission of movements is carried out by cables, belts, or chains, each of which passes in two different directions over two pulleys freely rotatable respectively on said two shafts.

The transmission of movements is carried out by gears, two toothed pinions freely rotatable on said two shafts being adapted to mesh with each other, the rotary motion of at least one rod which is coupled to one of the members to be pivotally attached being transmitted through said toothed pinions to at least one second rod which is coupled to the second member.

The transmission of movements is carried out both by means of cables, belts or chains and by gears, two toothed pinions freely rotatable on said two shafts being adapted to mesh with each other, said pinions being each made integral with at least one pulley over which passes a cable, belt, or chain, the driving cables, belts or chains being separate from the driven cables, belts or chains.

The invention finally consists in an application of one at least of the above-mentioned arrangements to the transmission of movements through an articulated polygon wherein the said arrangements are adopted in the case of at least the last articulation of said polygon.

A clear understanding of the present invention will in any case be gained from the complementary description which follows below and from the accompanying drawings, it being understood that said description and drawings are given solely by way of indication and not in any sense by way of limitation.

Figure 2:
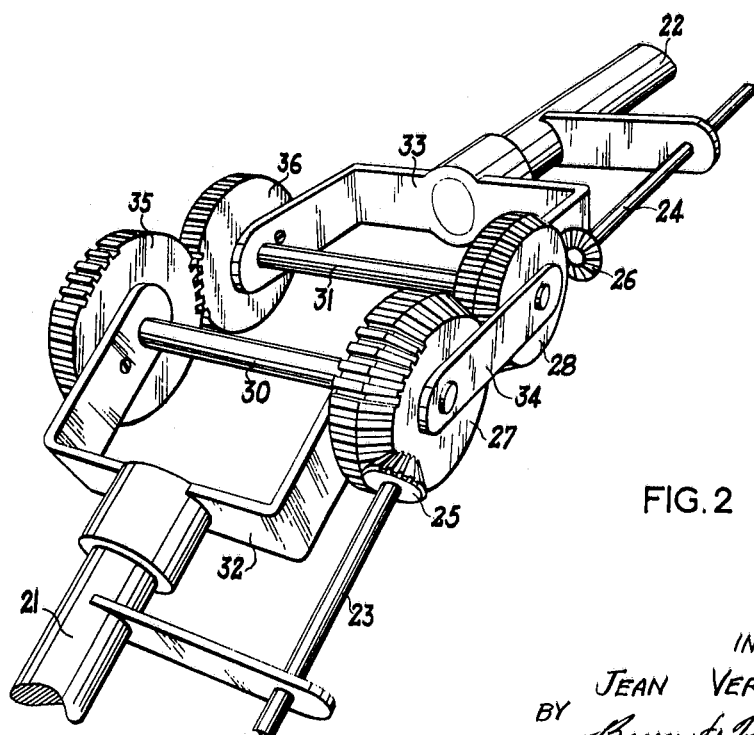
Figure 3:
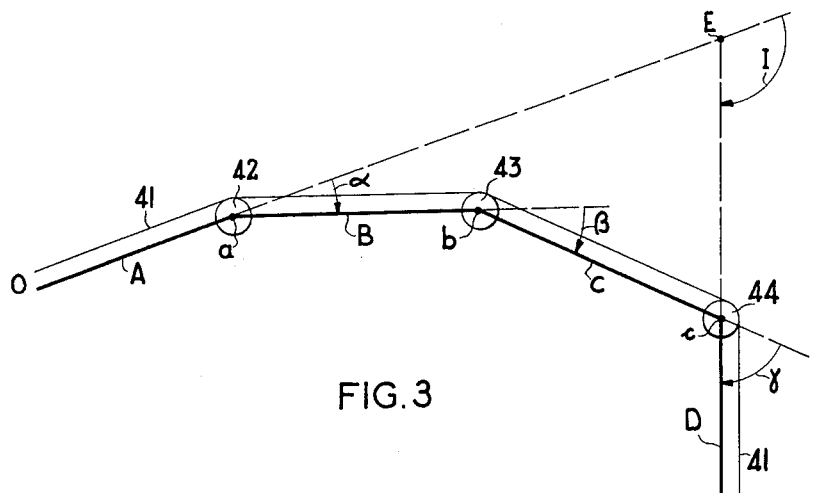
Figure 4:
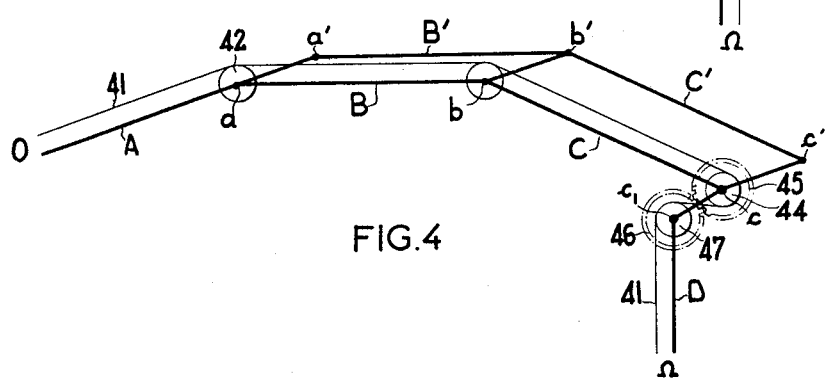
Figure 5:
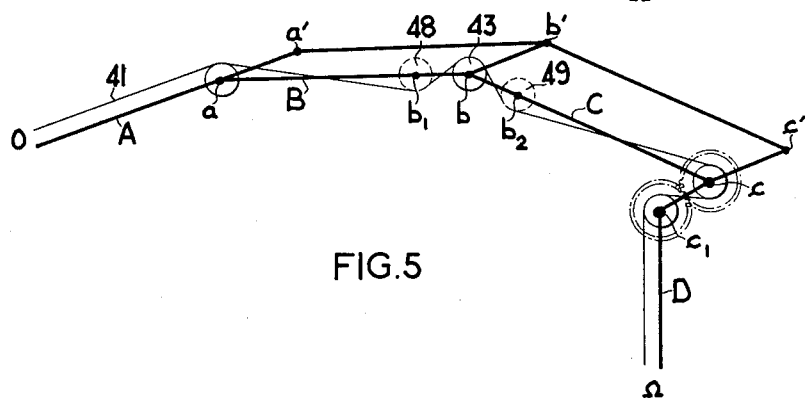

In the accompanying drawings:

FIG. 1 is a view taken in isometric perspective of an articulation device in accordance with the invention with transmission of movements by cables, FIG. 2 is a view in isometric perspective of an articulation device in accordance with the invention with transmission of movements by gears, FIG. 3 is a diagrammatic view of a conventional articulation system with transmission of movements by cables, FIGS. 4 and 5 are diagrammatic views of two articulated systems with transmission of movements by cables as improved in accordance with the invention.

In accordance with a first example of embodiment of an articulated device in accordance with the invention as illustrated in FIG. 1, the transmission of movements between two members, the upper member being indicated by the arm 1, whereas the lower member is not shown in the drawings, is carried out by a set of ropes or cables, such as the cable 2, which are provided in suitable number and which extend in directions such as the directions 2a and 2b respectively towards the two members to be pivotally coupled. The arm 1 together with the distance pieces 3 and 4 which form a part of said arm terminates in a yoke 5 in which is rotatably mounted a shaft 6. Similarly, the lower member terminates in a yoke which is not shown in the drawings and which is similar to the yoke 5 in which a shaft 7 is mounted to rotate freely. The distance between the shafts 6 and 7 is maintained constant by two connecting-arms 8 and 9 through which pass the four journals such as the journals 10 and 11 of the shafts 6 and 7. The shaft 6 carries two toothed sectors 12 and 13 which are rigidly fixed to the yoke 5 and the shaft 7 carries two toothed sectors 14 and 15 which are rigidly fixed to the yoke which has not been shown in the drawings whilst the toothed sectors 12 and 14 on the one hand and 13 and 15 on the other hand mesh with each other in pairs. Each of the cables such as the cable 2 passes in two different directions over two pulleys such as the pulleys 16 and 17 which have the same diameter and which are freely rotatable respectively on the two shafts 6 and 7.

The operation of the device which has just been described will become readily apparent when it is assumed that the connecting-arms 8 and 9 are stationary and the portions 2a and 2b of the cable 2 are motionless relatively to the articulated members. If the member 1 is caused to rotate about the journal 10, the lower member rotates through an equal angle and the length of the cable 2 which is in contact with the pulleys 16 and 17 does not vary. It will be understood that, when there is superimposed on the aforesaid movement a relative movement of the cable 2 which produces the rotation of the pulleys 16 and 17 and/or a general movement of the combined assembly of the two members which accordingly displaces the connecting-arms 8 and 9, the length of the cable which is in contact with the pulleys does not vary to any greater extent. If the pulleys 16 and 17 were to have a different diameter, it would in that case be merely necessary to employ toothed sectors having the same diameter ratio.

In the second example of embodiment of a device in accordance with the invention as illustrated in FIG. 2, the transmission of movements between the articulated members 21 and 22 is carried out by gears. It can be assumed for the sake of simplicity that the movement to be transmitted is single and consists of a movement of rotation of a driving rod 23 which is coupled to the member 21, said movement of rotation being imparted to the driven rod 24 which is coupled to the member 22. The rods 23 and 24 terminate in bevel-pinions 25 and 26 which mesh with two bevel-pinions 27 and 28, these latter having axes at right angles to said rods and meshing with each other by means of a second set of straight spur gear teeth. The pinions 27 and 28 are mounted to rotate freely on two shafts 30 and 31 carried respectively in the yokes 32 and 33 which terminate the members 21 and 22. The distance between the shafts 30 and 31 is maintained constant by two connecting-arms such as the connecting-arm 34. The yokes 32 and 33 are made integral with two toothed sectors 35 and 36 which mesh with each other.

The operation of the device which has just been described will readily be understood if the connecting-arms such as the connecting-arm 34 are assumed to be stationary. In this case, when the member 21 is displaced through a certain angle around the shaft 30, the set of toothed sections 35 and 36 will cause the member 22 to move through an opposite angle around the shaft 31. In this operation, the bevel-pinions 27 and 28 will not have rotated relative to their respective shafts 30 and 31 if the driving rod 23 has not rotated about its axis, and in the case in which a movement of rotation has been imparted to said driving rod 23, the transmission of this movement will have been faithfully carried out up to the rod 24. It will be understood that, when the assembly of shafts 30 and 31 considered together moves in space, the same reasoning holds true inasmuch as the connecting-arms such as the connecting-arm 34 maintain constant the distance between said shafts. It should be noted that the members 21 and 22 need not be in the same plane, in which case it would be merely necessary to make provision for bevel-toothed sectors 35 and 36 and concurrent shafts 30 and 31.

Provision can be made for an alternative form of FIG. 2 wherein the pinion 27 is no longer driven by the rod 23 and the bevel pinion 25, but by a cable, belt or chain passing over a pulley which is made integral with the pinion 27. The pinion 28 could also be made in that case to drive a pulley which is made fast therethrough and over which could be passed a cable, belt or chain.

It will be understood that the number of transmission systems of this type which are mounted on the shafts 30 and 31 can be suited to the number of movements to be transmitted.

Referring to FIGS. 3, 4 and 5, there will now be described below the application of an articulated device in accordance with the invention which is similar to that shown in FIG. 1, in the case of an articulated system of more complex design.

Referring to FIG. 3, it will be assumed that the arrangement contemplated is an articulated system consisting of the connected arms A, B, C and D wherein the transmission of a movement is carried out by a cable 41 passing over pulleys 42, 43 and 44 which are centered on pivotal axes $a$, $b$, $c$. The length of the cable 41 which is wound around the combined assembly between the points O and $\Omega$ is equal to the sum of the lengths of the arms A, B, C, D increased by the length of cable which is wound around the pulleys 42, 43 and 44. The bearing angles between the arms A$a$–B$b$, B$b$–C$c$ and C$c$–D$\Omega$ being respectively $\alpha$, $\beta$ and $\gamma$, the length of cable wound around the pulleys, all of which are assumed to have the same radius, will be equal to $(\alpha+\beta+\gamma)r$, $r$ being the common radius of said pulleys. Let I be the bearing angle of the arms A$a$ and D$\Omega$, at the point E at which their projections meet. If the articulated device A, B, C, D is deformed in such a manner that the said angle I remains constant (for example by displacing the arm A parallel to itself while the arm D remains stationary), the sum $\alpha+\beta+\gamma$ will remain constant inasmuch as it is equal to the angle I. The length of cable which is wound around the pulleys will accordingly remain constant and the total length of cable will not vary during the movements considered.

It accordingly follows that, during a more general movement wherein the angle I will vary, the variation in length of cable over the entire system will be equal to the variation only of this angle I multiplied by $r$.

It can thus be established from the foregoing that it is not necessary to compensate the variation in length of cable over each of the articulations $a$, $b$, $c$, but that it is merely necessary to do so at one point only, namely the last point of articulation of the articulated system, in this case the point $c$. And it is therefore at this point that provision should be made for a device in accordance with the invention which is similar to that shown in FIG. 1.

FIG. 4 is a diagrammatic view of one example of utilization of a device of this type in an articulated system. The arms B and C are, for example, duplicated by the arms B' and C' which are parallel thereto. The arm B' is pivotally coupled at $a'$ to the extension $a$–$a'$ of the arm A and at $b'$ to the arm C' and to the connecting-arm $b$–$b'$ which is parallel to $a$–$a'$. The arm C' is pivotally coupled at $b'$ to the arm B' and to the connecting-arm $b$–$b'$, and at $c'$ to the connecting-arm $c$–$c'$ which is parallel to $b$–$b'$ and therefore to $a$–$a'$. During the various movements of the series of articulated parallelograms which have thus been represented, the connecting-arm $c$–$c'$ will therefore remain constantly parallel to the arm A. It is thus readily apparent that it will merely be necessary to compensate the variation in length of the cable 41 which passes over the pulleys 42, 43 and 44, solely at the point $c$, the two members to be articulated being accordingly represented by the connecting-arm $c$–$c'$ and by the arm D. A device which is similar to that shown in FIG. 1 will therefore be fitted in position at the point $c$, the toothed sector 45 being integral with the connecting-arm $c$–$c'$, the toothed sector 46 which has an axis $c_1$ being integral with the arm D, the two toothed sectors 45 and 46 being in mesh with each other and the distance between the shafts on which said toothed sectors are mounted being maintained constant by the connecting-arm $c$–$c_1$. The cable 41 will accordingly pass in two different directions, first over the pully 44 having the axis $c$, then over the pulley 47 having the axis $c_1$.

It should be pointed out that all the foregoing considerations are valid in the form of arrangement of FIG. 4, that is to say when the cable 41 always rests on the pulleys 42, 43 and 44 outside the convex line O, $a$, $b$, $c$, and passes on the other side of the arm D only after having passed through the articulation device in accordance with the invention. It will be understood that, in this form of arrangement, the cable 41 will no longer rest on one of the pulleys if the above-mentioned line becomes concave at that articulation point at which said pulley is located.

In the case which is represented in FIG. 5, it has been assumed that this could only occur at the point $b$, and it is observed that it is in that case merely necessary to prevent the cable 41 from leaving the pulley 43 by virtue of two tension pulleys 48 and 49 having axes which are respectively designated as $b_1$ and $b_2$ one pulley being integral with the arm B whilst the other is integral with the arm C. Said two pulleys extend the arc over which the cable 41 is wound around the pulley 43.

It will naturally be understood that the invention is not limited in any sense to the constructional examples or to the modes of application which have been described and illustrated but is intended on the contrary to include within its scope any and all alternative forms, and in particular the application of the articulation device in accordance with the invention, especially in the case of either plane or distorted articulated polygons, to the various articulation systems with transmission of movements of remote-handling devices, mechanical arms and other devices for manipulation from a distance which are frequently employed in nuclear engineering.

What we claim is:

1. An articulated device for pivotally coupling two members and entailing the transmission of movement along said members, comprising: a pair of members disposed in spaced, opposed relation; a toothed sector rigidly connected with each of said member; a support arm; means pivotally mounting said toothed sectors on said support arm for movement about parallel axes spaced a fixed distance apart with the teeth of said toothed sectors in mesh; and a continuous mechanical power transmission means extending along said members in spaced, parallel relation thereto carried by said members for movement therewith, said power transmission means being pivotal about said parallel axes.

2. An articulated device for pivotally coupling two members and entailing the transmission of movement along said members, comprising: a pair of members disposed in spaced, opposed relation; support means; a toothed sector rigidly connected with each of said members pivotally mounted on said support means for movement about parallel axes spaced a fixed distance apart with the teeth of said toothed sectors in mesh; pulley means rotatably mounted on each of said members coaxially with each of said toothed sectors; and elongated, flexible mechanical power transmission means extending along and carried by said members trained in one direction over one of said pulley means and trained in the other direction over the other of said pulley means.

3. An articulated device for pivotally coupling two members and entailing the transmission of movement along said members, comprising: a pair of members disposed in spaced, opposed relation; support means; a toothed sector rigidly connected with each of said members pivotally mounted on said support means for movement about parallel axes spaced a fixed distance apart with the teeth of said toothed sectors in mesh; a toothed pinion rotatably mounted on each of said members coaxial with and spaced laterally from the respective toothed sector and with the teeth of said toothed pinions in mesh; pulley means rotatably mounted on each of said members coaxially with and disposed between the respective toothed sector and pinion; and elongated, flexible mechanical power transmission means extending along and carried by said members trained in one direction over one of said pulley means and trained in the other direction over the other of said pulley means.

4. An articulated device for pivotally coupling two members and entailing the transmission of movement along said members, comprising: a pair of members disposed in spaced, opposed relation; support means; a toothed sector rigidly connected with each of said members pivotally mounted on said support means for movement about parallel axes spaced a fixed distance apart with the teeth of said toothed sectors in mesh; a toothed pinion rotatably mounted on each of said members coaxially with the respective toothed sector and with the teeth of said toothed pinions in mesh; drive means carried by one of said members operably connected with the toothed pinion carried by said one member; and driven means carried by the other of said members operably connected with the toothed pinion carried by said other member.

5. An articulated device for pivotally coupling two members and entailing the transmission of movement along said members, comprising: a pair of members disposed in spaced, opposed relation; support means; a toothed sector rigidly connected with each of said members pivotally mounted on said support means for movement about parallel axes spaced a fixed distance apart with the teeth of said toothed sectors in mesh; a toothed pinion rotatably mounted on each of said members coaxially with the respective toothed sector and with the teeth of said toothed pinions in mesh; pulley means coaxial with each of said toothed pinions and rigid therewith; elongated, flexible, mechanical drive means extending along one of said members and trained over the pulley means carried by said one member; and elongated, flexible, mechanical driven means extending along the other of said members and trained over the pulley means carried by said other member.

6. An articulated device in accordance with claim 2 wherein said device is applied to the transmission of movements through a series of articulated parallelograms and forms the coupling means for at least the last articulation thereof.

References Cited by the Examiner

UNITED STATES PATENTS

| | | | |
|---|---|---|---|
| 357,594 | 2/1887 | Greenough | 74—385 |
| 1,361,578 | 12/1920 | Heck | 72—228 |
| 1,389,870 | 9/1921 | Noel | 74—385 |
| 1,854,586 | 4/1932 | Hyer | 74—385 |
| 2,333,292 | 11/1943 | Brooks | 74—384 |

DAVID J. WILLIAMOWSKY, *Primary Examiner.*

DON A. WAITE, *Examiner.*

L. H. GERIN, *Assistant Examiner.*